Figure 1:
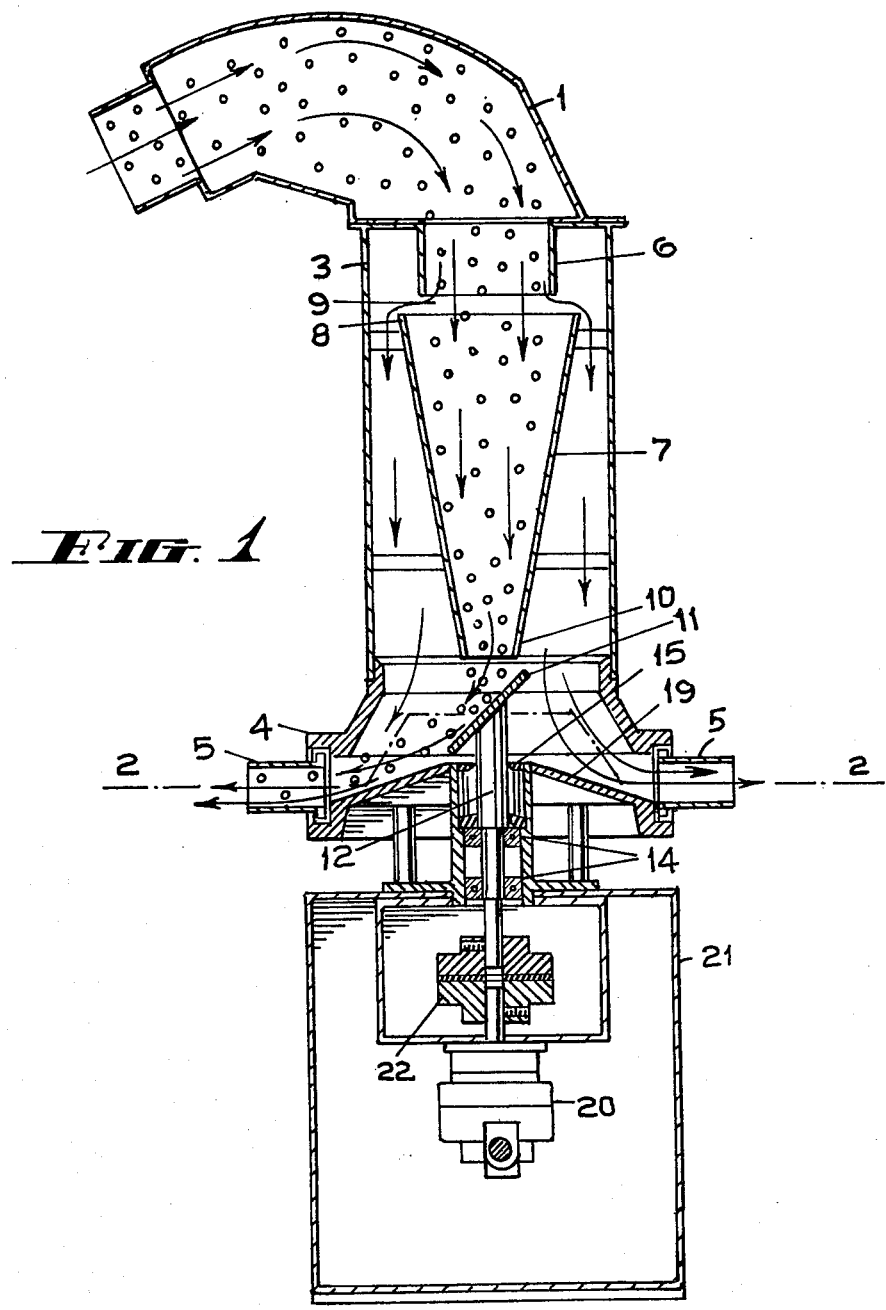

United States Patent [19]

Fuss et al.

[11] Patent Number: 4,480,794
[45] Date of Patent: Nov. 6, 1984

[54] AIR SEEDER DISTRIBUTOR

[76] Inventors: Albert K. Fuss, 1 Jellicoe St.; Eric W. Fuss, 3 Heller St.; Jarvis R. Fuss, 143 Tourist Rd.; Roy M. Fuss, 21 Leslie St., all of Toowoomba, Queensland, Australia, 4350

[21] Appl. No.: 450,733

[22] Filed: Dec. 17, 1982

[30] Foreign Application Priority Data

Nov. 9, 1982 [AU] Australia .............................. PF6709

[51] Int. Cl.³ ............................................ A01C 15/04
[52] U.S. Cl. .................................... 239/654; 239/689
[58] Field of Search ....................... 239/654, 655, 689; 406/70, 109, 155, 162, 181

[56] References Cited
FOREIGN PATENT DOCUMENTS
424836 2/1969 Australia .

Primary Examiner—John J. Love
Assistant Examiner—James R. Moon, Jr.
Attorney, Agent, or Firm—Wm. T. Wofford; James C. Fails; Arthur F. Zobal

[57] ABSTRACT

For an agricultural implement a distributor for feeding seed and/or fertilizer from an air duct to a series of distributor tubes leading to planter units in which the air-entrained seed and/or fertilizer is separated in the distributor to pass some air continuously to the distributor tubes and the remaining air and the seed and/or fertilizer is directed by a rotating deflector to flow sequentially into the series of distributor tubes.

4 Claims, 3 Drawing Figures

AIR SEEDER DISTRIBUTOR

This invention relates to an air seeder distributor and in particular it relates to a distributor designed to give uniform distribution of seed to a number of air seeder tubes leading to planting means.

It is already well known to distribute seed by blowing the seed from a distributor head through a number of tubes to the different distribution points on the seeder, and with the growth of machines of this type it has become customary to use a number of distributor points on a wide span machine fed from a common metering device.

A method of distribution to the individual seed tubes, commonly in use, is to have a cone or distributor which is designed to spread a stream of seed and/or fertiliser uniformly into a series of tubes leading from such a distributor head, but problems exist with this type of apparatus in that unequal distribution can take place if the distributor deflector, which as said may be of conical form, is not correctly centred, or the machine operates on ground which is not horizontal, and this defect applies to most of the devices which depend purely on static means to either distribute the seed by deflection from a cone or the like or by bounce from special surfaces. To overcome this problem we proposed a distributor head having mechanical deflection means driven to feed the seed sequentially to the various tubes, and reference may be had to our Australian Letters Patent No. 239,965 which utilized a rotating distributor into which the seed and/or fertiliser was fed and which then sequentially directed the seed to the radially arranged distributor tubes leaving the head.

According to another Australian Letters Patent of ours, No. 236,128, the device comprised a distributor head with the usual radial outlets thereto leading to the tubes and incorporating blower means rotating axially within the distributor, and the seed and/or fertiliser was fed to the blower means by an offset tube which was designed to effect radial distribution around the axis of the distributor head to get as nearly as possible uniform distribution sequentially to the various outlets.

These distributors were successfully used and followed an earlier distributor of ours, which was Australian Letters Patent No. 424,836, and which also used a series of distributor outlet tubes radially arranged around the periphery of a distributor drum and seed and/or fertiliser, was fed to each of the outlets sequentially by a rotating member on a driven shaft coaxial with the drum, this rotating member being designed to cause pulsing in the delivery tube by having wings on each side of its outlet to cover adjacent outlets as delivery of seed and/or fertiliser was taking place to any particular outlet, and that device also successfully distributed seed and/or fertiliser to a multiplicity of tubes around the periphery of the distributor.

The object of the present invention however is to provide yet further improvements to the distribution mechanism, and the invention can be summed up as a seed and/or fertiliser distributor for air seeders of the type having an air duct carrying seed and/or fertiliser through the duct to discharge same on to a revolving distributor member coaxial within a distributor drum which has a series of radial outlets around its periphery adapted to be joined to distributor tubes leading to planter units, but is characterised by means between the air duct and the distributor member to separate the seed and/or the fertiliser and some of the air from the remaining air and to direct the separated air and the seed and/or fertiliser to the deflector member for sequential direction to the outlets but to direct the remaining air to each of the outlets to maintain a continuous air-flow through the outlets.

The invention preferably comprises a special arrangement of the air feed to the various peripheral outlets to the distributor tubes in association with a driven deflector member positioned on a shaft coaxial with the distributor drum and having the seed and/or fertiliser directed onto it by a truncated conical guide having its lower end of lesser diameter than its upper end, and itself arranged within a cylindrical housing which has a coaxial inlet adjacent to the larger diameter opening of the conical guide shaped to form a nozzle which directs seed and/or fertiliser into the conical guide to discharge it onto the rotating deflector member which is positioned to direct the seed towards the outlet tubes mainly to the outlet tube opposite to the inclined deflector member but spreading seed also somewhat into the part of the distributor member forward of the deflector member, the aforesaid nozzle terminating near and coaxially with the conical guide at its larger end so that air flow can take place through a space between the nozzle and the conical guide into and downwards in the cylindrical housing and to the distributor outlets of the nozzles surrounding the lower part of the cylindrical housing.

In this way seed and/or fertiliser is carried by the air to the top of the cylindrical housing and air is directed by the nozzle down into the conical guide but because the conical guide has a smaller restrictive lower end adjacent to the rotating deflector member, air is also forced through the space between the nozzle and the conical guide to flow downwardly in the cylindrical housing and thus to the outlet tubes which surround radially the distributor drum at the lower part of the cylindrical housing.

Figure 2:
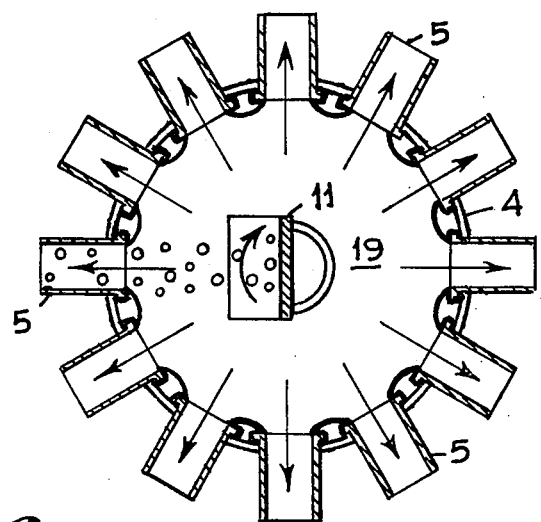
Figure 3:
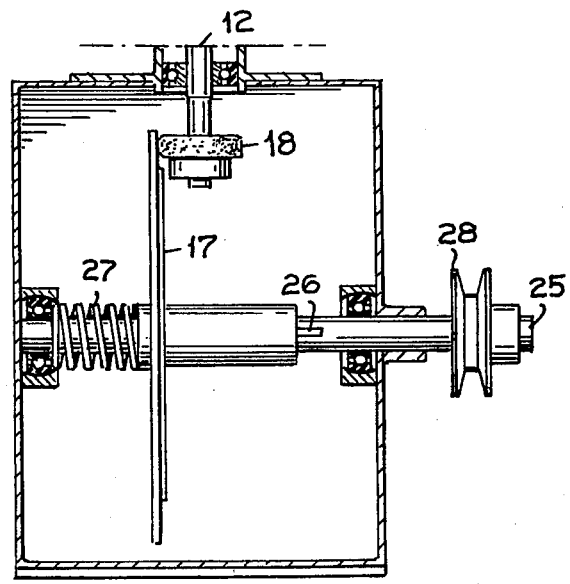

In order that the invention will be fully understood, an embodiment thereof will now be described with reference to the accompanying drawings in which:

FIG. 1 is a transverse section of the invention showing by arrows the air-flow direction and by circles the flow path of the seed and/or fertiliser, FIG. 2 is a transverse section of same on line 2—2 of FIG. 1, and FIG. 3 shows particularly a drive variation of that shown in FIG. 1.

The seed and/or fertiliser is fed through an air line from an air supply and seed and/or fertiliser supply to the duct 1 which as shown curves to join to the top of a cylindrical housing 3 which has at its lower end a distributor drum 4 having a series of peripheral outlets 5 which in use connect to distributor tubes each connected to a seeder unit of the implement in a well-known manner.

The duct 1 terminates in a nozzle 6 coaxially disposed in the upper part of the cylindrical housing to discharge seed and/or fertiliser, carried by pressure air, generally axially down the cylindrical housing 3 as shown by the arrows and small circles.

Coaxial with the nozzle 6, disposed coaxially within the cylindrical housing 3 is a separator guide 7 of truncated conical form which has its upper end 8 larger than and spaced from the nozzle 3 so that a space 9 is formed through which air can flow to pass downwardly between the separator guide 7 and the cylindrical housing 3, the truncated end 10 of the separated guide 7 being disposed above a deflector member 11 mounted on a shaft 12, the purpose of the deflector member 11 being to deflect air and seed and/or fertiliser outwards generally axially to the outlets 5 and thus into distributor tubes connected to the outlets 5.

Because the separator guide is of truncated conical form and has the truncated end 10 smaller in area than the nozzle 6, but the end 8 larger than the nozzle 6, air flow down the separator guide is restricted, and air thus flows through the space 9 between the nozzle 6 and the end 8 of the separator guide, supplying a constant air flow into the distributor drum uniformly around its axis, and this ensures a constant flow outwards through all of the peripheral outlets 5 to carry seed and/or fertiliser down the distributor tubes without interruption.

The air flow through the separator guide 7 however leaves the truncated end 10 at a substantial velocity because of the gradually restricted area and carries the seed and/or fertiliser with it to impinge on the deflector member 11 and the air-flow and the seed and/or fertiliser are directed outwards at least principally into that outlet 5 immediately opposite the deflector member where the deflected air and the seed and/or fertiliser carried by it joins the air flow maintained around the outside of the separator guide 7.

The deflector member 11 can be a simple plate inclined at an angle to the axis of the shaft 12 supported in bearings 14 coaxially with the separator guide 7 and cylindrical housing 3 and having sealing means 15 to prevent out-flow of air past same, the shaft 12 having driving means which can either be ground driven means through a disc 17 and engaging resiliently tired driving member 18 as shown in FIG. 3 or a drive from a gearbox 20 as shown in FIG. 1, or other means, the drive being arranged to constantly rotate the shaft 12 and thus the deflector member 11 so that while air continues to flow at all times through the tubes leading from the distributor drum 4, seed and/or fertiliser is separated from the air stream because of its inertia, and flows from the nozzle 6 directly into the separator guide 7 which directs it onto the deflector member 11 which in turn directs it sequentially to the outlets 5 to the distributor tubes (not shown) as the deflector member 11 rotates.

The floor 19 of the distributor drum slopes downward from the deflector member 11 to lead the seed and/or fertiliser into the outlets 5 so that a guided flow of air, seed and/or fertiliser takes place from the distributor plate 11.

The device just described thus forms a self contained distributor unit with mechanical direction of the seed to ensure correct seed distribution to each of the outlets 5 and thus to the tubes leading to the planting mechanisms, the airflow being separated as said so that airflow is continuous from the device through all of the outlets 5 and delivery tubes but the seed and/or fertiliser is fed into the tubes in an intermittent manner by sequentially being directed to the outlets 5 around the periphery of the distributor drum 4, this arrangement having been found to give highly effective distribution of the seed while at the same time maintaining proper airflow in the tubes carrying the seed to the planting mechanism.

The actual construction of the device can be somewhat varied and for instance the deflector member 11 can be a flat plate as shown inclined to the axis of rotation which is also the axis of the separator guide 7 and cylindrical housing 3, or the member could be shaped to distribute seed over a lesser or a greater angle than occurs with a flat plate, the arrangement depending on the particular requirement of the machine and the manner in which the seed and/or fertiliser is to be delivered to the planting mechanism.

In the form shown in FIG. 1 the distributor drum is supported from a base 21 which houses the gearbox 20, a coupling 22 in the shaft 12 allowing for any axial misalignment.

In the form shown in FIG. 3 the shaft 12 has on it the resiliently tired driving member 18, the disc 17 being axially slidable on the shaft 25 but non-rotationally held by a key 26, the disc 17 being urged into contact with the driving member 18 by a spring 27. The pulley 28 can receive its drive by a belt engaging a pulley on a ground wheel of the implement to give a ground-related rate of revolution of the shaft 12 and the driven deflector member 11.

It will be realised that the distance between seed and/or fertiliser deposits of the seeder unit connected to a particular distributor tube will vary according to the rate of forward travel of the seeder as related to the rate of revolution of the deflector member, and therefore with a constant forward travel the deflector member can be constantly driven, but with forward rate of travel variation the form of drive shown in FIG. 3 should be used.

We claim:

1. A seed and/or fertiliser distributor for air seeders comprising a rotating distributor to sequentially direct seed and/or fertiliser to a series of outlets on a distributor drum, characterised by
  - a housing extending from an air and seed and/or fertiliser supply duct to a distributor drum having a series of outlets around its periphery,
  - a rotatable shaft coaxial in said distributor drum carrying within said distributor drum an inclined deflector member,
  - means to drive the said shaft,
  - a nozzle on said supply duct directed into said housing to be coaxial therewith to discharge seed and/or fertiliser on to said deflector member, and
  - a truncated conical separator guide coaxial within the said housing having its larger end adjacent to the said nozzle and of greater diameter than the said nozzle to leave a space therebetween and its truncated end of smaller diameter than the said nozzle and terminating adjacent to the said deflector member,
  - whereby seed and/or fertiliser and some air is directed through said separator guide on to said distributor member to be sequentially directed to said outlets on said distributor drum as said distributor member is rotated, but the remaining air flows through said space to between said separator guide and said cylindrical housing directly to the said outlets on the said distributor drum.

2. A distributor according to claim 1 wherein the said shaft carrying the said deflector plate is adapted to be driven at a constant speed to determine seed and/or fertiliser spacing in relation to constant rate of forward travel of the air seeder.

3. A distributor according to claim 1 wherein the said shaft is adapted to be driven at a speed determined by the ground speed of the said air seeder to have constant distance spacing of the seed and/or fertiliser irrespective of changes in the rate of forward travel of the air seeder.

4. A distributor according to claim 1 wherein the said distributor drum has its floor downwardly sloping outward from the said deflector member to assist in guiding seed and/or fertiliser into the said outlets around the perimeter of the distributor drum.

* * * * *